(12) United States Patent
Labat et al.

(10) Patent No.: US 8,667,139 B2
(45) Date of Patent: Mar. 4, 2014

(54) MULTIDIMENSIONAL MODELING OF SOFTWARE OFFERINGS

(75) Inventors: Jerome Labat, San Carlos, CA (US); Ramachandran Varadharajan, Fremont, CA (US); Wilson W. Lau, San Francisco, CA (US); Thomas C. Bishop, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 214 days.

(21) Appl. No.: 13/031,950

(22) Filed: Feb. 22, 2011

(65) Prior Publication Data

US 2012/0215919 A1 Aug. 23, 2012

(51) Int. Cl.
*G06F 15/173* (2006.01)

(52) U.S. Cl.
USPC ............ 709/226; 709/216; 709/228; 370/237

(58) Field of Classification Search
USPC ............................ 709/226, 228, 216; 370/237
See application file for complete search history.

(56) References Cited

U.S. PATENT DOCUMENTS

| | | | |
|---|---|---|---|
| 5,596,744 A * | 1/1997 | Dao et al. ............................... | 1/1 |
| 6,011,780 A * | 1/2000 | Vaman et al. ................... | 370/237 |
| 6,336,204 B1 * | 1/2002 | Jevtic ............................. | 700/121 |
| 6,976,083 B1 * | 12/2005 | Baskey et al. .................. | 709/232 |
| 8,244,504 B1 * | 8/2012 | Jacobs .............................. | 703/2 |
| 2003/0120780 A1 | 6/2003 | Zhu | |
| 2005/0004929 A1 | 1/2005 | Stephenson | |
| 2005/0177600 A1 | 8/2005 | Eilam | |
| 2005/0177628 A1 | 8/2005 | Victoria | |
| 2007/0149216 A1 * | 6/2007 | Misikangas ................. | 455/456.1 |
| 2009/0193149 A1 * | 7/2009 | Khosravy ....................... | 709/248 |
| 2010/0034149 A1 * | 2/2010 | Lederer et al. ................ | 370/329 |
| 2010/0077461 A1 * | 3/2010 | Nguyen et al. ..................... | 726/5 |
| 2011/0208822 A1 * | 8/2011 | Rathod .......................... | 709/206 |
| 2011/0307401 A1 * | 12/2011 | Altman .......................... | 705/320 |
| 2012/0030365 A1 * | 2/2012 | Lidstrom et al. .............. | 709/228 |

* cited by examiner

*Primary Examiner* — Tesfay Yohannes
(74) *Attorney, Agent, or Firm* — Park, Vaughan, Fleming & Dowler LLP; Chia-Hsin Suen (57) ABSTRACT

The disclosed embodiments provide a system that facilitates the deployment and execution of a software offering. During operation, the system obtains a service definition of the software offering and a resource definition of resources available for use by the software offering. Next, the system creates a multidimensional model of the software offering by mapping a first set of elements from the service definition to a second set of elements from the resource definition. Finally, the system uses the multidimensional model to manage the deployment and execution of the software offering without requiring manual configuration of the resources by a user.

18 Claims, 6 Drawing Sheets

MULTIDIMENSIONAL MODELING OF SOFTWARE OFFERINGS

RELATED APPLICATION

The subject matter of this application is related to the subject matter in a co-pending non-provisional application by the same inventors as the instant application and filed on the same day as the instant application, entitled "Automatic Provisioning of Resources to Software Offerings," having Ser. No. 13/031,968 TO BE ASSIGNED, and filing date TO BE ASSIGNED.

BACKGROUND

Related Art

The present embodiments relate to techniques for managing software offerings. More specifically, the present embodiments relate to a multidimensional model that facilitates the provisioning, deployment, and execution of a software offering on a set of resources.

Recent computing trends have shifted the processing and consumption of data and services to cloud computing systems. Such cloud computing systems allow software providers to deploy, execute, and manage software offerings on shared infrastructure resources such as servers, network equipment, platform-virtualization software, and/or datacenter space. Furthermore, such resources may be dynamically provisioned and/or scaled, thus enabling consumption of the resources as services.

For example, a cloud computing provider may provide virtualized storage, network, and/or computing resources to multiple cloud computing customers. The cloud computing customers may deploy software offerings on the virtualized resources and pay the cloud computing provider only for resources consumed by the software offerings. As a result, the cloud computing customers may avoid capital expenditures associated with purchasing, setting up, and/or managing the underlying hardware and software. Furthermore, the centralization and sharing of infrastructure resources may improve the resources' utilization rates and management overhead.

Hence, the deployment, execution, and management of software offerings may be facilitated by mechanisms for dynamically allocating and configuring infrastructure resources used by the software offerings.

SUMMARY

The disclosed embodiments provide a system that facilitates the deployment and execution of a software offering. During operation, the system obtains a service definition of the software offering and a resource definition of resources available for use by the software offering. Next, the system creates a multidimensional model of the software offering by mapping a first set of elements from the service definition to a second set of elements from the resource definition. Finally, the system uses the multidimensional model to manage the deployment and execution of the software offering without requiring manual configuration of the resources by a user.

In some embodiments, the service definition contains a topology or a policy.

In some embodiments, the topology comprises one or more tiers, a set of service components, and a set of connections.

In some embodiments, creating the multidimensional model of the software offering involves identifying, from the service definition, a set of requirements associated with the software offering, and allocating a subset of the resources from the resource definition to the service components based on the set of requirements.

In some embodiments, using the multidimensional model to manage the deployment and execution of the software offering involves at least one of:
  (i) automatically deploying the software offering on the allocated resources;
  (ii) enabling identification of the allocated resources;
  (iii) facilitating identification of failures during execution of the software offering; and
  (iv) managing changes associated with the software offering or the resources.

In some embodiments, the resource definition contains at least one of a resource, a resource cluster, a security zone, a hosting segment, and a location.

In some embodiments, each of the resources is a computing resource, a network resource, or a storage resource.

In some embodiments, each of the resources is a physical resource or a virtual resource.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating the deployment and execution of a software offering. The software offering may correspond to an application that is deployed on one or more servers and accessed over a network connection. For example, the software offering may provide a web application, distributed application, and/or web service to users of the software offering.

More specifically, the disclosed embodiments provide a method and system for creating a multidimensional model of the software offering and using the multidimensional model to manage the deployment and execution of the software offering. The multidimensional model may include a service definition of the software offering and a resource definition of resources available for use by the software offering. To create the multidimensional model, a first set of elements from the service definition may be mapped to a second set of elements from the resource definition. The mappings may represent the allocation of resources from the resource definition to service components from the service definition. As a result, the multidimensional model may provide a comprehensive view of all software and hardware components used by the software offering, as well as interrelationships and/or dependencies among the components.

In turn, the multidimensional model may allow the deployment and execution of the software offering to be managed without requiring manual configuration of the resources by a user. For example, the multidimensional model may facilitate the automatic deployment of the software offering on the resources, the identification of resources allocated to the software offering, the identification of failures during execution of the software offering, and/or the management of changes associated with the software offering or the resources.

Figure 1:
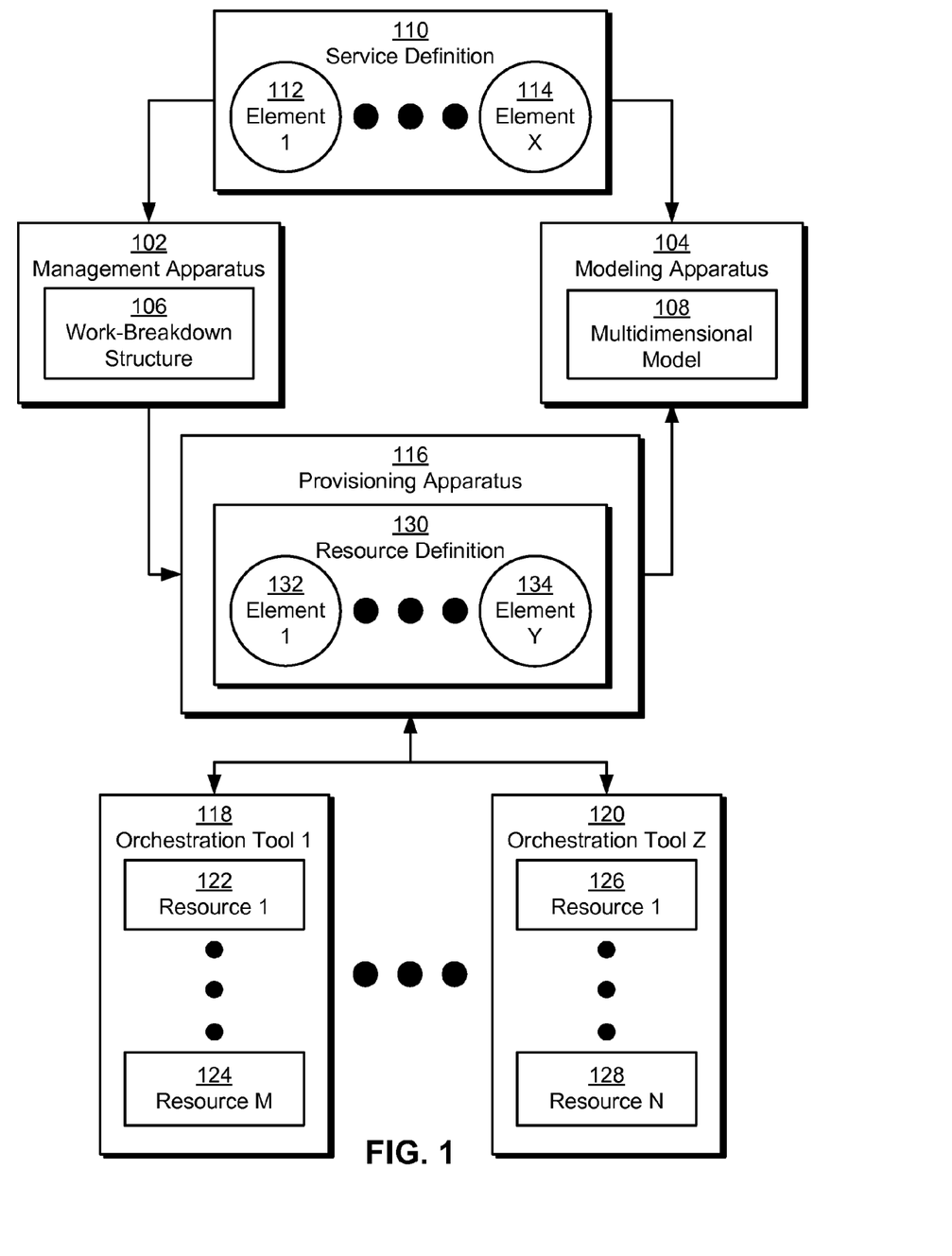
FIG. 1 shows a schematic of a system in accordance with an embodiment.

FIG. 1 shows a schematic of a system in accordance with an embodiment. As shown in FIG. 1, the system includes a management apparatus 102, a modeling apparatus 104, and a provisioning apparatus 116. Each of these components is discussed in further detail below.

In one or more embodiments, the system of FIG. 1 is used to manage the deployment and execution of a software offering on a set of resources (e.g., resource 1 122, resource m 124, resource 1 126, resource n 128). The software offering may correspond to a software program that performs tasks for a set of users. For example, the software offering may allow the users to collaborate on projects, file income taxes, manage personal or small business finances, and/or perform data mining on a target data set.

Furthermore, the software offering may be implemented using a client-server architecture. Components of the software offering may be deployed and executed on one or more servers (e.g., in a data center) and accessed from other machines using a locally installed executable, a command-line interface, and/or a web browser and network connection. In other words, the software offering may be implemented using a cloud computing system that is accessed over the Internet.

To enable execution of the software offering, users associated with the creation, deployment, and/or execution of the software offering may determine a set of requirements associated with the software offering. The users may then allocate resources (e.g., resource 1 122, resource m 124, resource 1 126, resource n 128) in the cloud computing system to components in the software offering and configure the allocated resources in a way that allows the executing software offering to meet the requirements. For example, a development team for the software offering may provide a policy specifying a level of availability, reliability, scalability, security, and/or response time in the software offering.

Administrators for the cloud computing system may ensure compliance with the policy by allocating sufficient infrastructure resources to the software offering and/or configuring the resources to provide requisite levels of redundancy, security, and/or load balancing in the software offering.

Those skilled in the art will appreciate that the cloud computing system may use virtualization to deploy and execute the software offering on a set of shared resources. In particular, a number of orchestration tools (e.g., orchestration tool 1 118, orchestration tool z 120) may be used to virtualize and/or provision different types of resources in the cloud computing system. For example, a virtual machine monitor may allocate and/or manage computing resources by creating and executing virtual machines as abstractions of physical servers. Similarly, a virtual filer may combine storage resources from a variety of storage devices into a resource pool and allocate logical volumes of storage from the resource pool. Finally, network routers and/or switches may partition network resources into virtual local area networks (VLANs) that connect physical and/or virtual computing and/or storage resources in the cloud computing system.

Moreover, each orchestration tool may include functionality to dynamically re-provision resources in response to changes in the software offering and/or in demand for the resources. For example, a virtual machine monitor may instantiate a new virtual machine to enable the addition of a new web server to the software offering. The virtual machine monitor may also allocate a set of physical computing resources (e.g., processor, memory, etc.) to the virtual machine to enable execution of the web server on the resources. Finally, the virtual machine monitor may move the virtual machine to a different set of physical resources if the web server's resource requirements change and/or the physical resources (e.g., servers) used to execute the web server become overloaded.

In other words, the use of resources by the software offering may be managed by a number of disparate, independently acting orchestration tools. As a result, the cloud computing system may lack a comprehensive view of dependencies between software components in the software offering and the hardware resources used to execute the software components. For example, the cloud computing system may lose track of resources allocated to the software offering once the orchestration tools begin reallocating and/or re-provisioning the resources.

Such lack of dependency information may cause problems with tracking and managing events and/or failures in the cloud computing system. For example, a server outage in the cloud computing system may require manual intervention by administrators to determine the set of hardware and software components affected by the outage and/or perform corrective actions that enable recovery from the server outage.

In one or more embodiments, the system of FIG. 1 reduces complexity associated with managing requirements and dependencies in the software offering by creating a multidimensional model 108 of the software offering and using multidimensional model 108 to manage the deployment and execution of the software offering. As shown in FIG. 1, multidimensional model 108 may be created from a service definition 110 of the software offering and a resource definition 130 of resources available for use by the software offering.

Service definition 110 may be obtained from a user (e.g., developer, architect, etc.) associated with the creation and/or development of the software offering. More specifically, service definition 110 may correspond to a logical representation of the software offering in terms of the software offering's configuration, topology, policies, and/or quality-of-service (QoS) attributes. As a result, elements (e.g., element 1 112, element x 114) of service definition 110 may include one or more tiers, a set of service components, and/or a set of connections. For example, an architect of the software offering may provide service definition 110 by inputting the number of tiers, level of security, software-development-lifecycle stage, and/or software stack associated with the software offering into a user interface provided by management apparatus 102. Service definition 110 is discussed in further detail below with respect to FIG. 2.

On the other hand, resource definition 130 may be obtained from administrators and/or orchestration tools of the cloud computing system and correspond to a logical representation and/or division of available infrastructure resources in the cloud computing system in terms of the resources' locations, states, and/or utilization. Elements (e.g., element 1 132, element y 134) of resource definition 130 may thus represent physical and/or virtual resources, resource clusters, security zones, hosting segments, and/or locations in the cloud computing system. For example, an administrator may manually populate resource definition 130 with an inventory of physical and/or virtual resources in the cloud computing system, or provisioning apparatus 116 may receive notifications of changes to resources (e.g., addition of new resources, removal of existing resources) in the cloud computing system from the orchestration tools (e.g., virtual machine monitors, virtual filers) and update resource definition 130 accordingly. Resource definition 130 is discussed in further detail below with respect to FIG. 3.

To create multidimensional model 108, modeling apparatus 104 may map a first set of elements (e.g., element 1 112, element x 114) from service definition 110 to a second set of elements (e.g., element 1 132, element y 134) from resource definition 130. The mappings may represent dependencies of the first set of elements on the second set of elements. For example, a mapping from a service component in service definition 110 to a resource in resource definition 130 may indicate the allocation of the resource to the service component by an orchestration tool. Multidimensional model 108 is discussed in further detail below with respect to FIG. 4.

In one or more embodiments, the creation of multidimensional model 108 involves the identification of a set of requirements associated with the software offering from service definition 110, as well as the subsequent allocation of a subset of the resources from resource definition 130 to service components in service definition 110 based on the requirements. In particular, management apparatus 102 may determine the software offering's requirements from a set of policies in service definition 110 and store the requirements in a work-breakdown structure 106. The policies may include a software-development-lifecycle policy, a security policy, a software-template policy, a QoS policy, and/or a structural policy. The requirements may thus specify the amount and/or configuration of resources required to satisfy the policies.

Next, provisioning apparatus 116 may use work-breakdown structure 106 to automatically provision a set of resources for use by the software offering without requiring manual configuration of the resources by a user (e.g., administrator). For example, provisioning apparatus 116 may use work-breakdown structure 106 to create a set of service containers for hosting the software offering. Provisioning apparatus 116 may then allocate resources to the service containers by requesting the required amounts and/or configurations of resources from the corresponding orchestration tools. Automatic provisioning of resources to software offerings is discussed in a co-pending non-provisional application by the same inventors as the instant application and filed on the same day as the instant application, entitled "Automatic Provisioning of Resources to Software Offerings," having Ser No. 13/031,968 TO BE ASSIGNED, and filing date TO BE ASSIGNED, which is incorporated herein by reference.

As mentioned previously, multidimensional model 108 may include dependencies between service components in service definition 110 and resources in resource definition 130. Consequently, modeling apparatus 104 may create multidimensional model 108 by mapping resources allocated by provisioning apparatus 116 to the service components to which the resources were allocated.

Modeling apparatus 104 may also update the mappings based on changes to the provisioned resources. For example, resources provisioned to service components may change as new resources are allocated, currently allocated resources are de-allocated, and/or different sets of physical resources are used to execute virtualized resources (e.g., virtual machines, logical volumes, VLANs, etc.). Such changes may be obtained by provisioning apparatus 116 through querying and/or monitoring of the orchestration tools. The changes may also be used by provisioning apparatus 116 to update resource definition 130. The updates may then be propagated to multidimensional model 108 via modeling apparatus 104.

Because multidimensional model 108 contains an up-to-date representation of service components, resources, and dependencies in the software offering, the system of FIG. 1 may facilitate management of the software offering within the cloud computing system. For example, multidimensional model 108 may facilitate the automatic deployment of the software offering on the allocated resources, identification of resources allocated to the software offering, identification of failures during execution of the software offering, and/or management of changes associated with the software offering or the resources. In other words, the creation and update of multidimensional model 108 may reduce complexity and/or overhead associated with configuration management, fault diagnosis and remediation, deployment, and/or resource provisioning in the software offering.

Figure 2:
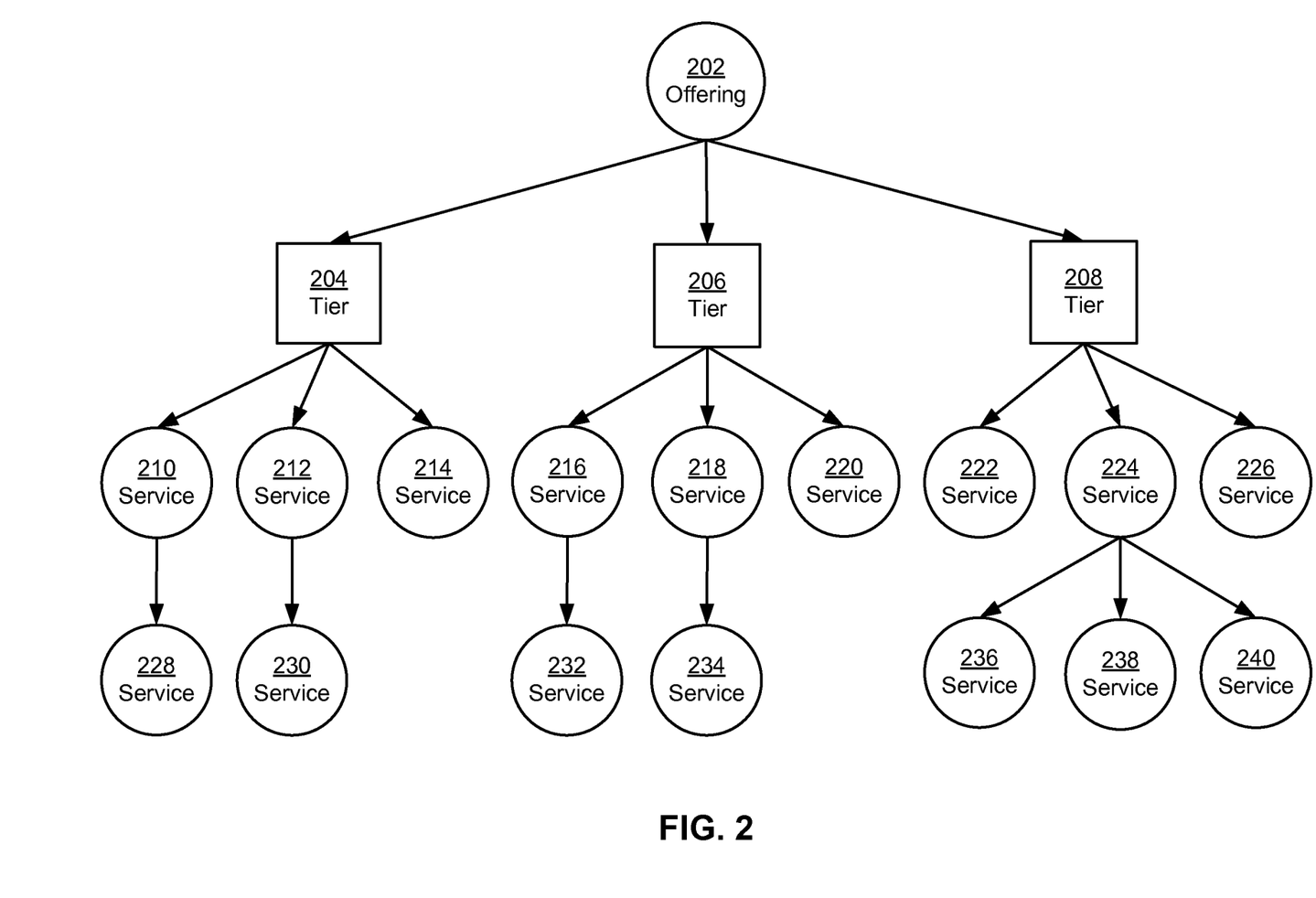
FIG. 2 shows a service definition for a software offering in accordance with an embodiment.

FIG. 2 shows a service definition for a software offering in accordance with an embodiment. As described above, the service definition may correspond to a logical representation of the software offering in terms of the software offering's configuration, topology, policies, and/or QoS attributes. Consequently, creation of the service definition may begin with the instantiation of a root offering node 202 representing the service offering. Offering node 202 may contain information related to the development and/or ownership of the software offering. For example, offering node 202 may include the name of the software offering, a group (e.g., team, business unit, etc.) in charge of developing the software offering, a project to which the software offering belongs, and/or a software-development-lifecycle stage associated with the software offering (e.g., development, pre-production, production).

Next, a number of tier nodes 204-208 connected to offering node 202 may define the topology of the software offering. More specifically, tier nodes 204-208 may indicate the number of tiers used in a client-server architecture of the software offering. For example, the service definition may include one tier node if the software offering is developed around a single logical layer. On the other hand, the service definition may include three tier nodes (e.g., tier nodes 204-208) to represent the presentation, application, and data tiers of a three-tier architecture. Finally, the service definition may include more than three tier nodes if the software offering includes more than one application tier, data tier, and/or presentation tier.

Furthermore, a set of service nodes 210-240 below tiers 204-208 may represent service components that enable and/or implement the functionality of the software offering. For example, service nodes 210-240 may represent server operating systems, software stacks (e.g., application servers and web servers), database management systems, authentication services, payment systems, and/or mobile services.

In addition, dependencies in the software offering may be denoted by connections between pairs of service nodes 210-240 and/or between service nodes 210-240 and tiers nodes 204-208. As shown in FIG. 2, connections between service and tier nodes may indicate that services corresponding to service nodes 210-214 are dependencies of (e.g., used by) a first tier represented by tier node 204. The connections may also indicate that services corresponding to service nodes 216-220 are dependencies of a second tier represented by tier node 206. Finally, the connections may indicate that services corresponding to service nodes 222-226 are dependencies of a third tier represented by tier node 208.

One-to-one connections between service nodes 228, 230, 232, and 234 and service nodes 210, 212, 216, and 218 may denote the dependence of one service on only one other service, while many-to-one connections between service node 224 and service nodes 236-240 may indicate the dependence of one service on multiple services. For example, connections between pairs of service nodes 210 and 228, 212 and 230, 216 and 232, and 218 and 234 may represent the dependency associated with executing a software stack on an operating system. On the other hand, a connection of one service node 224 to multiple service nodes 236-240 may represent the dependence of a database instance on a relational database management system (RDBMS) and one or more operating systems.

As with offering node 202, tier nodes 204-208 and service nodes 210-240 may include information that is relevant to the components and/or tiers represented by the nodes. For example, each tier node 204-208 may identify an architectural tier (e.g., "web server," "application server," "database") in the software offering, and each service node 210-240 may include the name and/or version of the corresponding service component (e.g., JBoss (JBoss™ is a registered trademark of Red Hat, Inc.), Red Hat Enterprise Linux (RHEL), Oracle Database 11g).

Furthermore, each node (e.g., offering node 202, tier nodes 204-208, service nodes 210-240) may be associated with one or more policies, such as a security policy, a software-template policy, a QoS policy, and/or a structural policy. As discussed in the above-referenced application, the policies may influence the creation of a work-breakdown structure (e.g., work-breakdown structure 106 of FIG. 1) that is then used to dynamically allocate resources to service components represented by service nodes 210-240.

Figure 3:
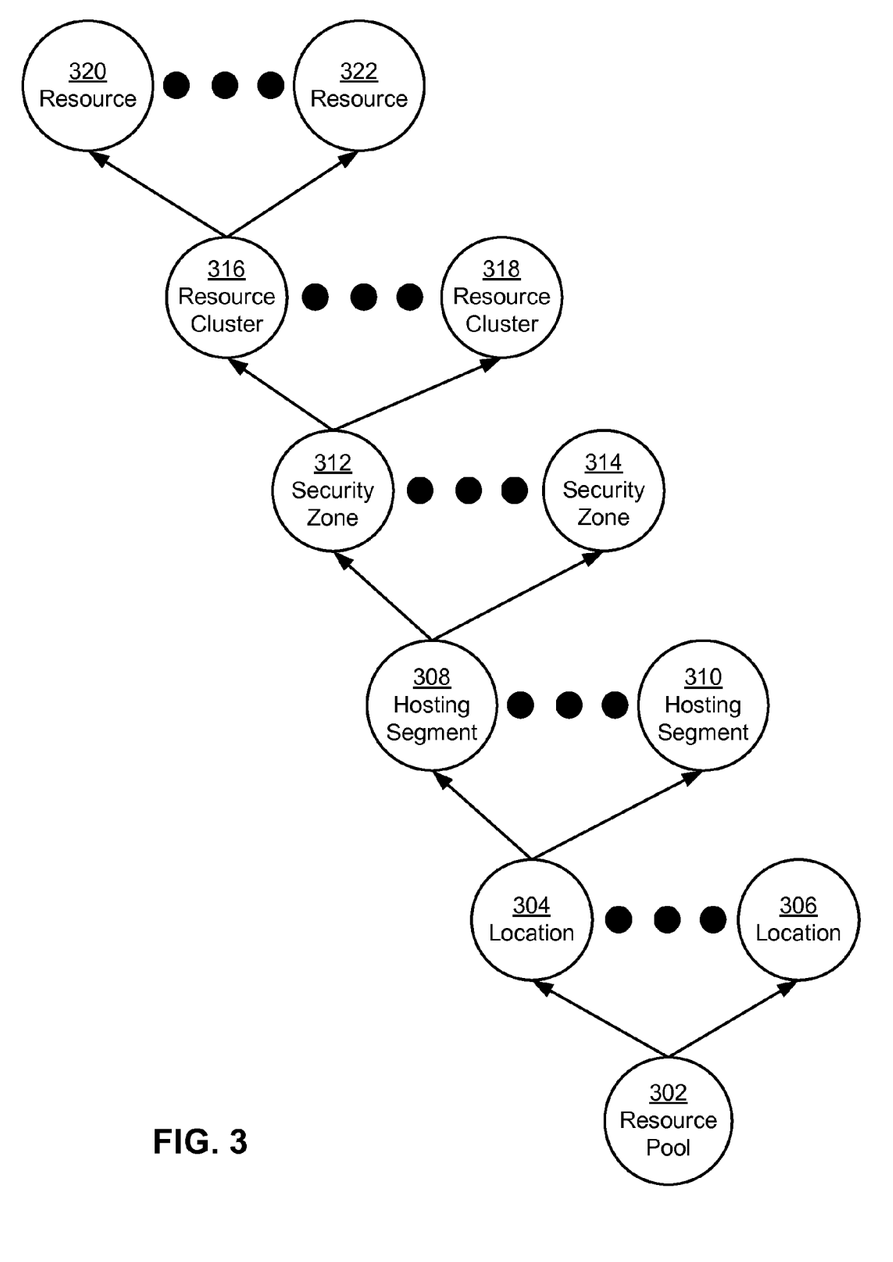
FIG. 3 shows the structure of a resource definition in accordance with an embodiment.

FIG. 3 shows the structure of a resource definition in accordance with an embodiment. The resource definition may correspond to a logical representation and/or division of available infrastructure resources in a cloud computing system in terms of the resources' locations, states, and/or utilization. In other words, the resource definition may provide a bottom-up view of the cloud computing system, beginning with a root resource pool node 302 representing a set of infrastructure resources that may be used by a software offering. As a result, resource pool node 302 may include a name that identifies the cloud computing system and/or a particular resource pool of the cloud computing system.

In one or more embodiments, the division of resources in the cloud computing system is represented by a set of connections in the resource definition. More specifically, each connection may be a directed edge from a first node to a second node in the resource definition. The first node may thus represent a container in the resource definition, and the second node may represent a resource for the container.

Consequently, a set of location nodes 304-306 connected to resource pool node 302 may represent the division of the resource pool into different physical locations of the resources. For example, each location node may include the name of a data center in the cloud computing system and/or a physical location (e.g., address, geographic coordinates, etc.) of the data center.

Each location node 304-306 may then be connected to a set of hosting segment nodes 308-310. Hosting segment nodes 308-310 may represent the division of a data center into multiple hosting segments. Each hosting segment may correspond to a fixed-size block of physical computing, storage, and network resources in the data center. The hosting segment may also be divided into sub-segments representing different stages of the software development lifecycle for a software offering (e.g., development, pre-production, production).

Furthermore, hosting segments may be associated with different power and/or cooling requirements. For example, a data center may contain three hosting segments with three racks each; one hosting segment may have low power and/or cooling requirements, one hosting segment may have moderate power and/or cooling requirements, and one hosting segment (e.g., a high-performance hosting segment) may have high power and/or cooling requirements. Hosting segment nodes 308-310 may thus allow resources in the cloud computing system to be allocated based on the software-development-lifecycle stage of the software offering and/or QoS requirements such as reliability, availability, response time, and/or scalability in the software offering.

Each hosting segment node 308-310 may also reference a security zone node 312-314. Security zone nodes 312-314 may represent the division of a hosting segment into secure, non-secure, and/or public security zones. Like the hosting segments, each security zone may include a fixed number of physical resources. Consequently, security zone nodes 312-314 may be used to restrict network-based access to the resources in accordance with a security policy associated with the software offering.

Continuing with the resource definition, each security zone node 312-314 may be connected to a set of resource cluster nodes 316-318, while each resource cluster node 316-318 may be connected to a set of resource nodes 320-322. Resource cluster nodes 316-318 and resource nodes 320-322 may represent distinct resource clusters within the security zones and the physical and/or virtual resources in each resource cluster, respectively. For example, computing resource clusters may include non-overlapping sets of physical servers and/or virtual machines, storage resource clusters may include physically distinct filers and/or logically distinct virtual filers, and network resource clusters may include disparate sets of physical or virtual load balancers, switches, firewalls, and/or network interface cards (NICs).

Resource cluster nodes 316-318 and resource nodes 320-322 may further facilitate the configuration and/or provisioning of resources to the software offering based on the software offering's policies and/or requirements. For example, a service definition for the software offering may specify the use of an application server, a database, and multiple web servers in the software offering. To enforce security policies in the service definition, resources for the database may be provisioned from a secure zone (e.g., to protect unauthorized access to data), resources for the application server may be provisioned from a non-secure zone, and resources for the web servers may provisioned from a public security zone (e.g., to enable hosting of public websites by the web servers). Furthermore, the web servers may be mapped to different resource clusters to meet QoS requirements associated with response time and/or fault tolerance in the software offering.

Figure 4:
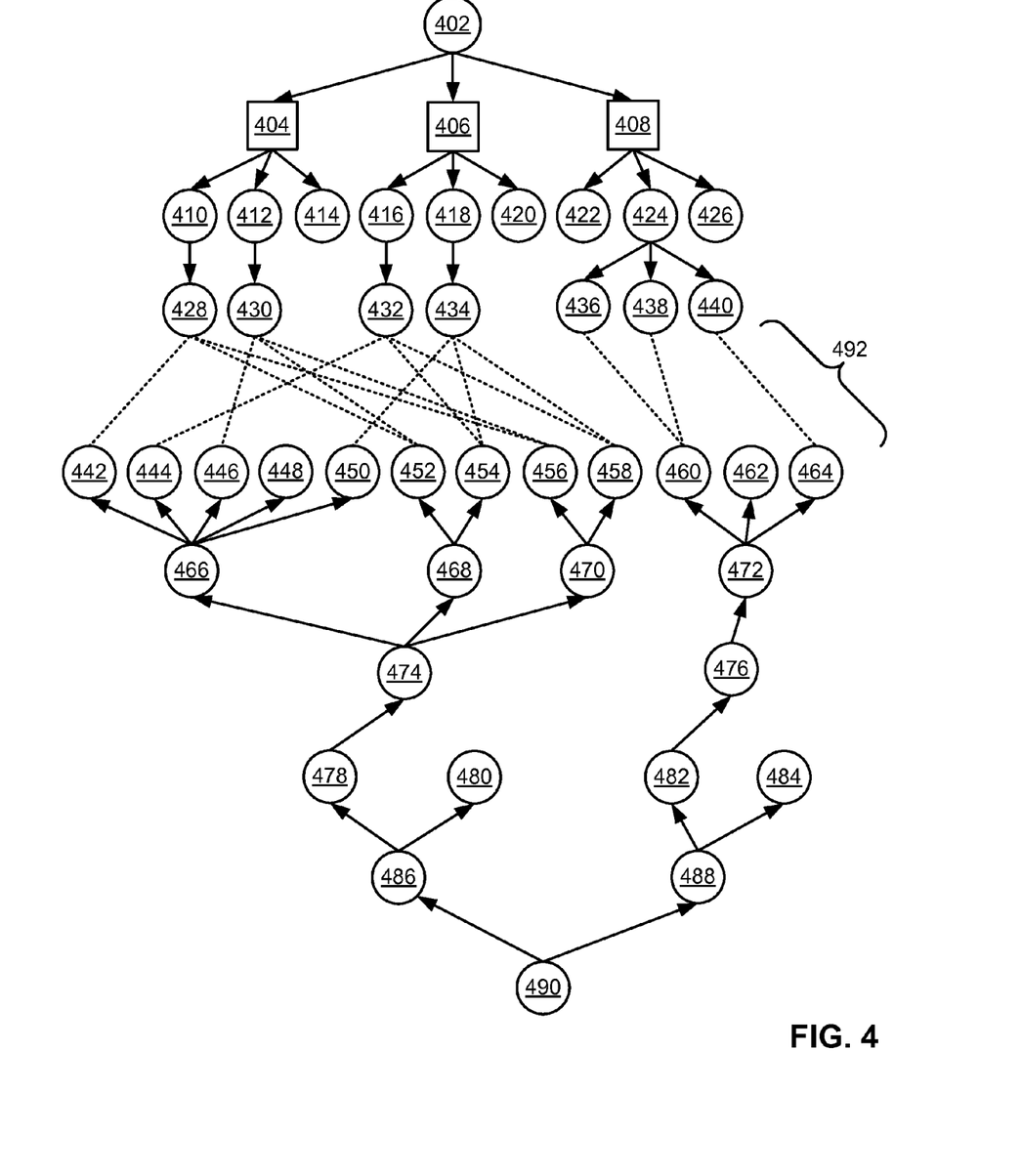
FIG. 4 shows a multidimensional model of a software offering in accordance with an embodiment.

FIG. 4 shows a multidimensional model of a software offering in accordance with an embodiment. The multidimensional model may include a number of elements 402-490 and a set of mappings 492.

In particular, elements 402-440 may form a service definition of the software offering, such as the service definition of FIG. 2. As a result, element 402 may correspond to an offering node, elements 404-408 may correspond to tier nodes, and elements 410-440 may correspond to service nodes in the service definition. Conversely, elements 442-490 may form a resource definition of resources available for use by the software offering. For example, element 490 may be a resource pool node, elements 486-488 may be location nodes, and elements 478-484 may be hosting segment nodes. Along the same lines, elements 474-476 may be security zone nodes, elements 466-472 may be resource cluster nodes, and elements 442-464 may be resource nodes.

Mappings 492 may represent the allocation of physical and/or virtual resources from the resource definition to service components from the service definition. For example, elements 442-450 may represent physical and/or virtual computing resources, elements 452-454 may represent physical and/or virtual network resources, elements 456-458 may represent physical and/or virtual storage resources, and elements 460-464 may represent physical and/or virtual resources that reside in a separate location (e.g., data center) from that of the resources represented by elements 442-458. As a result, mappings 492 may indicate that service components represented by elements 428-434 are allocated one computing resource, one network resource, and one storage resource each. Mappings 492 may also show that service components represented by elements 436-438 share a physical and/or virtual resource represented by element 460, and that the service component represented by element 440 is given full use of a physical and/or virtual resource represented by element 464.

The lack of mappings 492 to elements 448 and 462 may indicate the presence of unallocated resources in the resource definition. Such unallocated resources may be subsequently allocated to the software offering if the software offering's requirements for response time, availability, and/or reliability increase. On the other hand, the unallocated resources may be used in the provisioning of resources to a different software offering if the software offering does not require additional infrastructure resources.

Figure 5:
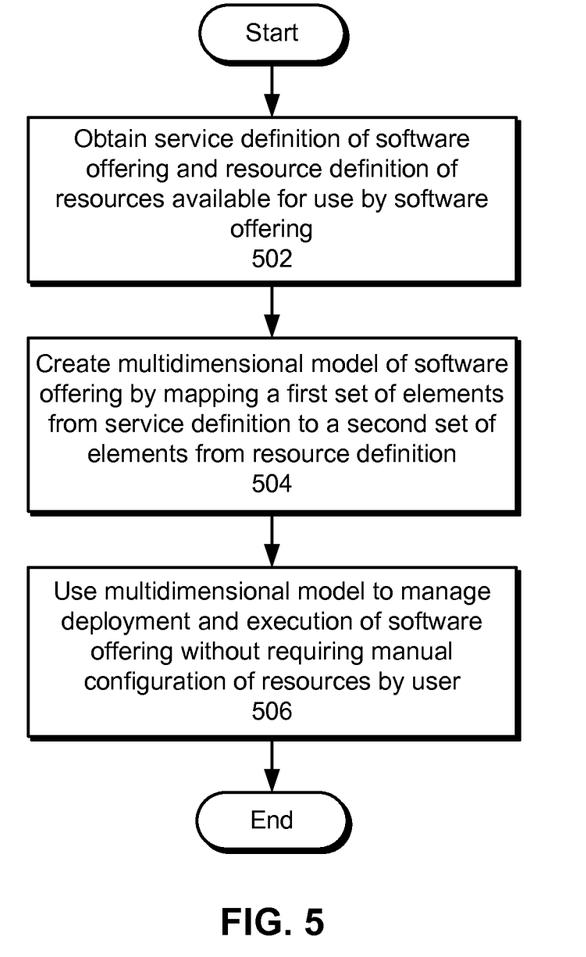
FIG. 5 shows a flowchart illustrating the process of facilitating the deployment and execution of a software offering in accordance with an embodiment.

FIG. 5 shows a flowchart illustrating the process of facilitating the deployment and execution of a software offering in accordance with an embodiment. In one or more embodiments, one or more of the steps may be omitted, repeated, and/or performed in a different order. Accordingly, the specific arrangement of steps shown in FIG. 5 should not be construed as limiting the scope of the technique.

First, a service definition of the software offering and a resource definition of resources available for use by the software offering are obtained (operation 502). The service definition may be provided by a user associated with the development of the software offering, while the resource definition may be provided by a user and/or orchestration tool associated with management of infrastructure resources for the software offering.

Next, a multidimensional model of the software offering is created by mapping a first set of elements from the service definition to a second set of elements from the resource definition (operation 504). The mappings may represent the provisioning of physical and/or virtual computing, network, and storage resources to service components in the software offering. Consequently, the multidimensional model may provide a comprehensive view of software and/or hardware components used by the software offering, as well as dependencies between the components.

The multidimensional model may then be used to manage the deployment and execution of the software offering without requiring manual configuration of the resources by the user (operation 506). For example, the multidimensional model may enable identification of resources allocated to the software offering, as well as the automatic deployment of the software offering on the allocated resources. Updating of the multidimensional model during execution of the software offering may additionally facilitate identification of failures in the software offering and/or management of changes associated with the software offering or the resources.

Figure 6:
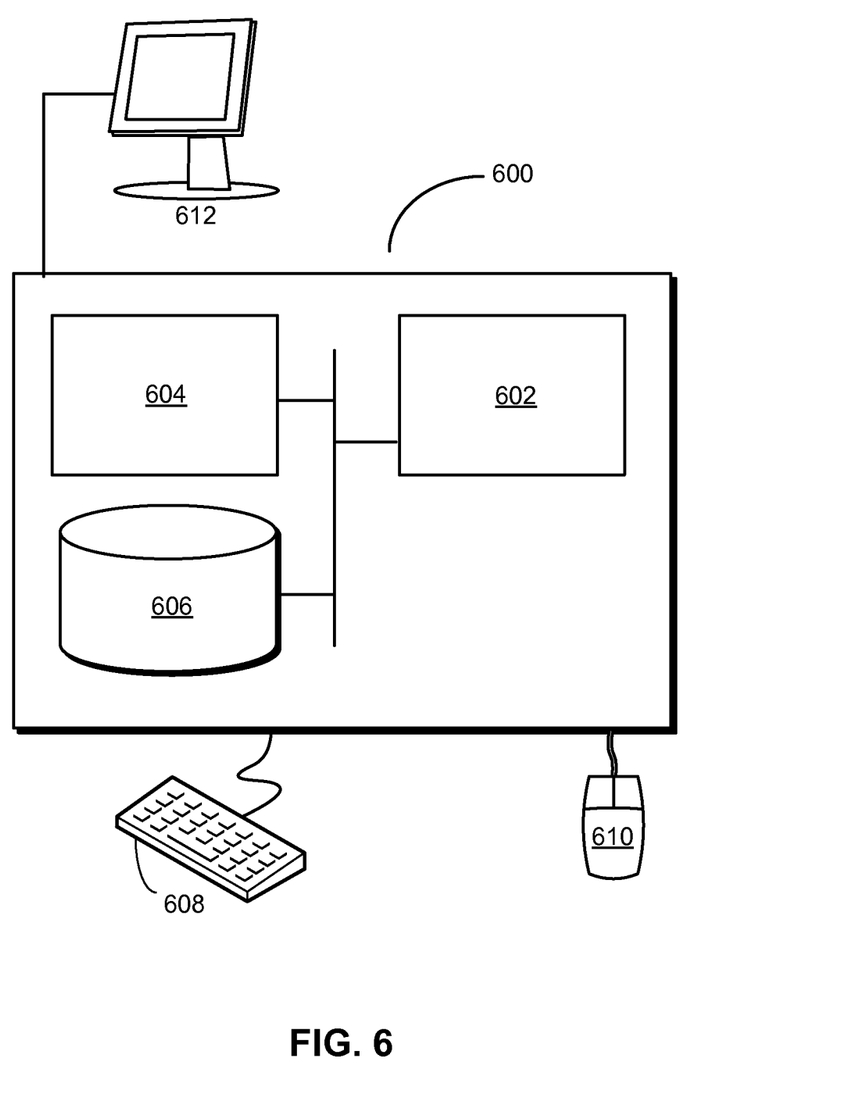
FIG. 6 shows a computer system in accordance with an embodiment.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an OS (not shown) that coordinates the use of hardware and software resources on computer system 600, as well as one or more applications that perform specialized tasks for the user. To perform tasks for the user, applications may obtain the use of hardware resources on computer system 600 from the OS, as well as interact with the user through a hardware and/or software framework provided by the OS.

In particular, computer system 600 may provide a system for facilitating the deployment and execution of a software offering. The system may include a management apparatus that obtains a service definition of the software offering. The system may also include a modeling apparatus that creates a multidimensional model of the software offering by mapping a first set of elements from the service definition to a second set of elements from a resource definition of resources available for use by the software offering. The multidimensional model may then be used by the management apparatus to manage the deployment and execution of the software offering without requiring manual configuration of the resources by a user.

In addition, one or more components of computer system 600 may be remotely located and connected to the other components over a network. Portions of the present embodiments (e.g., management apparatus, modeling apparatus, etc.) may also be located on different nodes of a distributed system that implements the embodiments. For example, the present embodiments may be implemented using a cloud computing system that provides a multidimensional model for managing the deployment and execution of a software offering on a set of resources.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating deployment of a software offering, comprising:
    obtaining a service definition of the software offering and a resource definition of a set of resources available for use by the software offering, wherein the service definition includes service components and a set of policies, wherein the set of policies specify a set of requirements for executing the service components;
    creating a multidimensional model of the software offering by:
        identifying, from the service definition, the set of requirements associated with the software offering, wherein the set of requirements specify at least a configuration and an amount of the set of resources required to satisfy the set of policies,
        identifying a subset of resources from the set of resources that satisfy the set of requirements for executing the service components on the subset of resources,
        creating a relationship between the subset of resources and the service components based on the set of requirements, and
        allocating the subset of resources from the set of resources to the service components, wherein each of the set of resources is at least one of a computing resource, a network resource, and a storage resource; and
    using the multidimensional model to manage the deployment of the software offering without requiring manual configuration of the set of resources by a user, wherein the deployment of the software offering involves enabling execution of the service components on the allocated subset of resources.

2. The computer-implemented method of claim 1, wherein the service definition comprises at least one of a topology and a policy.

3. The computer-implemented method of claim 2, wherein the topology comprises one or more tiers, a set of service components, and a set of connections.

4. The computer-implemented method of claim 1, wherein using the multidimensional model to manage the deployment of the software offering involves at least one of:
    automatically deploying the software offering on the allocated subset of resources;
    enabling identification of the allocated subset of resources;
    facilitating identification of failures during execution of the software offering; and
    managing changes associated with the software offering or the subset of resources.

5. The computer-implemented method of claim 1, wherein the set of resources comprises at least one of a resource, a resource cluster, a security zone, a hosting segment, and a location.

6. The computer-implemented method of claim 1, wherein each of the set of resources is at least one of a physical resource and a virtual resource.

7. A system for facilitating deployment of a software offering, comprising:
    a management apparatus configured to obtain a service definition of the software offering and a resource definition of a set of resources available for use by the software offering, wherein the service definition includes service components and a set of policies, wherein the set of policies specify a set of requirements for executing the service components; and
    a modeling apparatus configured to create a multidimensional model of the software offering by
        identifying, from the service definition, the set of requirements associated with the software offering, wherein the set of requirements specify at least a configuration and an amount of the set of resources required to satisfy the set of policies,
        identifying a subset of resources from the set of resources that satisfy the set of requirements for executing the service components on the subset of resources,
        creating a relationship between the subset of resources and the service components based on the set of requirements, and
        allocating the subset of resources from the set of resources to the service components,
    wherein each of the set of resources is at least one of a computing resource, a network resource, and a storage resource,
    wherein the multidimensional model is used by the management apparatus to manage the deployment of the software offering without requiring manual configuration of the set of resources by a user, wherein the deployment of the software offering involves enabling execution of the service components on the allocated subset of resources.

8. The system of claim 7, wherein the service definition comprises at least one of a topology and a policy.

9. The system of claim 8, wherein the topology comprises one or more tiers, a set of service components, and a set of connections.

10. The system of claim 7, wherein using the multidimensional model to manage the deployment of the software offering involves at least one of:
    automatically deploying the software offering on the allocated subset of resources;
    enabling identification of the allocated subset of resources;
    facilitating identification of failures during execution of the software offering; and
    managing changes associated with the software offering or the subset of resources.

11. The system of claim 7, wherein the set of resources comprises at least one of a resource, a resource cluster, a security zone, a hosting segment, and a location.

12. The system of claim 7, wherein each of the set of resources is at least one of a physical resource and a virtual resource.

13. A non-transitory computer-readable storage medium storing instructions that when executed by a computer cause the computer to perform a method for facilitating deployment of a software offering, the method comprising:

obtaining a service definition of the software offering and a resource definition of a set of resources available for use by the software offering, wherein the service definition includes service components and a set of policies, wherein the set of policies specify a set of requirements for executing the service components;

creating a multidimensional model of the software offering by:
    identifying, from the service definition, the set of requirements associated with the software offering, wherein the set of requirements specify at least a configuration and an amount of the set of resources required to satisfy the set of policies,
    identifying a subset of resources from the set of resources that satisfy the set of requirements for executing the service components on the subset of resources,
    creating a relationship between the subset of resources and the service components based on the set of requirements, and
    allocating the subset of resources from the set of resources to the service components, wherein each of the set of resources is at least one of a computing resource, a network resource, and a storage resource; and using the multidimensional model to manage the deployment of the software offering without requiring manual configuration of the set of resources by a user, wherein the deployment of the software offering involves enabling execution of the service components on the allocated subset of resources.

14. The non-transitory computer-readable storage medium of claim 13, wherein the service definition comprises at least one of a topology and a policy.

15. The non-transitory computer-readable storage medium of claim 14, wherein the topology comprises one or more tiers, a set of service components, and a set of connections.

16. The non-transitory computer-readable storage medium of claim 13, wherein using the multidimensional model to manage the deployment of the software offering involves at least one of:
    automatically deploying the software offering on the allocated subset of resources;
    enabling identification of the allocated subset of resources;
    facilitating identification of failures during execution of the software offering; and
    managing changes associated with the software offering or the subset of resources.

17. The non-transitory computer-readable storage medium of claim 13, wherein the set of resources comprises at least one of a resource, a resource cluster, a security zone, a hosting segment, and a location.

18. The non-transitory computer-readable storage medium of claim 13, wherein each of the set of resources is at least one of a physical resource and a virtual resource.

\* \* \* \* \*